Jan. 8, 1974  J. L. RICHARDSON ET AL  3,784,470
COMPOSITE COILED MEMBRANE ASSEMBLY
Filed Nov. 20, 1972
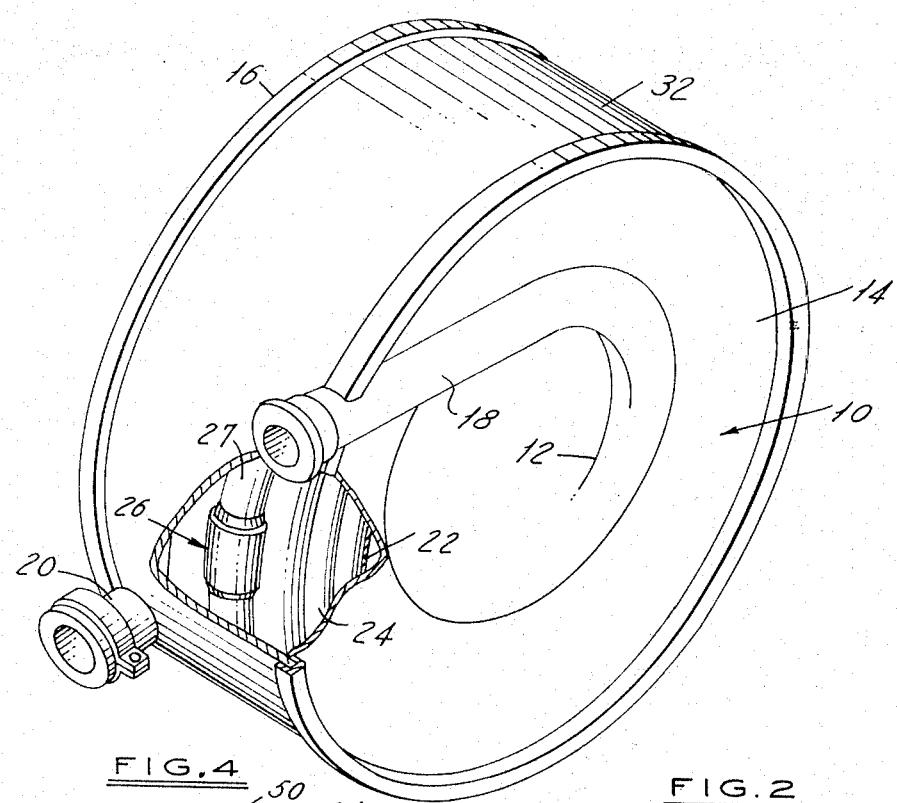
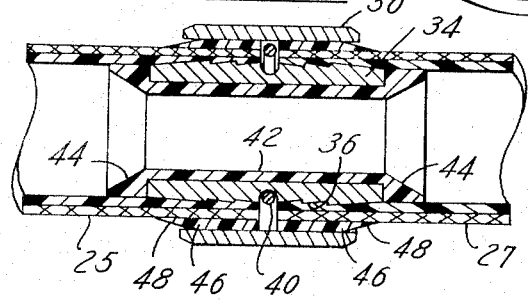
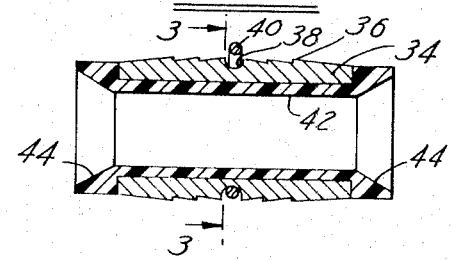
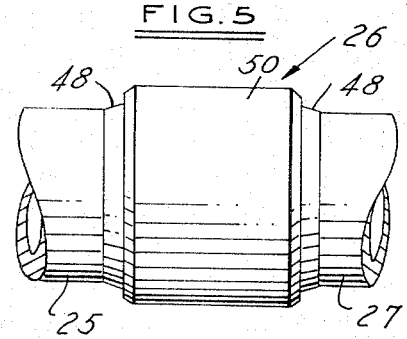
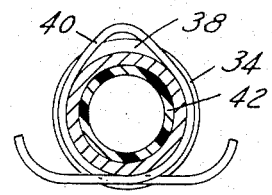

United States Patent Office 3,784,470
Patented Jan. 8, 1974

3,784,470
COMPOSITE COILED MEMBRANE ASSEMBLY
John Lloyd Richardson and Gilbert Segovia, Santa Ana, Fred Ju, Huntington Beach, and Wilfred Hugo Bachle, Long Beach, Calif., assignors to Philco-Ford Corporation, Blue Bell, Pa.
Filed Nov. 20, 1972, Ser. No. 308,120
Int. Cl. B01d 31/00
U.S. Cl. 210—321    5 Claims

ABSTRACT OF THE DISCLOSURE

Separate lengths of semipermeable membrane suitable for reverse osmosis and ultrafiltration are connected to each other by a short, strong connector assembly. The resulting assembly is wound onto a spool shaped housing in a helical multi-layered coil. A compressible or elastomeric pad separates the inner diameter of the coil from the hub of the housing to absorb dimensional changes caused by pressurization of the membrane during its operation in a reverse osmosis system. The connector assembly preferably includes soft elastomeric extensions on each end of an inner member which fits inside the connected ends of the membrane to dissipate stress concentrations.

SUMMARY OF THE INVENTION

This invention relates to the inventions disclosed in U.S. patent applications Richardson et al. Ser. No. 162,247, filed July 13, 1971 and entitled Helical Reverse Osmosis Segment, and Richardson et al. Ser. No. 198,612, filed Nov. 15, 1971 and entitled Multilayer Braided Tubular Membrane Reinforcement and is assigned to the assignee thereof.

Reverse osmosis techniques have been known for some time to be useful for separating a liquid from a mixture or solution containing such liquid. Active development of reverse osmosis began recently and has produced considerable improvements not only in the structural components of a reverse osmosis system but also in the application of such system to a wide variety of uses. One very important use of reverse osmosis lies in its ability to produce potable water from brackish water and reverse osmosis systems are being used for this purpose within the United States and in numerous foreign countries.

Early reverse osmosis membranes of a tubular construction were installed linearly in relatively large elongated housings. Each membrane was located within a perforated metal tube that provided the structural support necessary to withstand the high pressures applied during operation. The inventions provided by the aforementioned patent applications reduced cost and space requirements by providing a tubular membrane supported by a braided fabric and capable of being wound into a helical coil. Whereas linear membrane installations were limited to membrane lengths of about 20 feet, the helical coil construction permitted the use of membranes having 2 to 2½ times that length. Current techniques of manufacturing the membrane itself limit a continuous tubular membrane to a length of about 50 feet even though longer membranes are highly desirable since efficiency and performance vary directly with membrane length.

The composite membrane assembly of this invention comprises two or more membrane lengths connected to each other by a connector assembly that is sufficiently short to avoid interference with the coiling operation but nevertheless prevents unnecessary stress in the fragile membranes at its connections thereto. An apparatus containing the composite membrane assembly of this invention for separating a liquid from a mixture or solution containing the liquid comprises a housing and a first length of coiled semipermeable membrane located in the housing. A second length of coiled semipermeable membrane is located in the housing and is connected to the first length by a short, strong connector assembly capable of withstanding large frequent pressure variations without kinking or fatiguing the membrane.

The connector assembly comprises an inner sleeve projecting into the interiors of the ends of the first membrane length and the second membrane length so that the inner sleeve bears against the interior surfaces of the membranes. A locating member positioned on the exterior surface of the inner sleeve is spaced between the membrane ends to locate and retain the inner sleeve in its proper position. An outer sleeve surrounds the ends of the membrane and clamps the ends against the inner sleeve.

A soft elastomeric extention is bonded or otherwise attached to each end of the inner sleeve. The extensions preferably have a cylindrical outer surface and a funnel-shaped inner surface that not only reduces localized flow turbulence but also improves the deflection properties of the extensions to reduce stresses in the membranes. The extensions also facilitate passage of a compressible cleaning plug through the interior of the connection.

Short cylindrical inserts preferably are located between the outer sleeve of the connector assembly and the outer surface of the supported membrane. The inserts can be made of a polymeric material such as polycarbonate and the projecting ends of the inserts are tapered exteriorly to distribute stresses and to produce a large radius of curvature transition from the fitting internal diameter to the pressurized membrane tube internal diameter. A pressing or swaging operation typically is used to compress the outer sleeve into position to produce a structurally integral connector assembly.

Tubular membranes useful in this invention can be made of any of a variety of materials such as cellulose acetates, polyamides and other compositions having the desired permselective properties. A braided supporting construction is applied to the exterior of the tubular membrane to provide the strength necessary for withstanding the pressures used during reverse osmosis operation. Typical braided support constructions are disclosed in the aforementioned patent applications.

A spool molded of relatively rigid polymeric material serves effectively as the housing for the membrane assembly. A compressible or elastomeric pad is included on the hub of the spool where the pad is positioned between the inner course of the coiled membrane and the hub. The elastomeric pad not only permits adjusting coil position during the operation of winding the coil onto the hub but also absorbs dimensional changes that occur during pressurization of the coiled membrane. A hub having a smaller diameter thus can be used and this feature, coupled with the longer membrane assemblies, greatly reduces space requirements, for example, a package that contains a one hundred foot length of a composite membrane assembly is only approximately thirty percent larger in total envelope volume than the previous package containing a fifty foot membrane.

BRIEF DESCRIPTION OF THE DRAWING

FIG. 1 is a perspective view of an apparatus of this invention showing the molded spool having a coiled composite membrane assembly positioned therein. A portion of the figure is broken away to show the connector assembly.

FIG. 2 is a sectioned elevation of the inner sleeve of the connector assembly that shows the elastomeric extension and the linear spring that serves as the locating member.

FIG. 3 is a sectional view taken along line 3—3 of FIG. 2 to show additional details of the linear spring.

FIG. 4 is a sectional elevation of a complete connector assembly that shows the relationship of the inner sleeve, the cylindrical inserts and the outer sleeve.

FIG. 5 is an external view of the complete connector assembly of FIG. 4.

DETAILED DESCRIPTION

Referring to FIG. 1, a spool 10 that is molded of a relatively rigid polymeric material such as an ABS copolymer comprises a hub portion 12 having two disc-shaped end portions 14 and 16 projecting radially therefrom. A cylindrical inlet portion 18 is molded into side member 14 and an outlet member 20 is molded into side member 16. Additional details of members 18 and 20 can be found in the aforementioned U.S. patent application Ser. No. 162,247.

The exterior surface of spool 12 is covered with an elastomeric pad 22. Pad 22 typically is made of a foamed rubber such as neoprene and preferably has sufficient resiliency to prevent undue stresses in spool 12 that might be caused by expansion of the membrane assemblies under the pressures involved in reverse osmosis operation. Thicker or thinner pads can be used to provide adjustment for the desired length if membrane that will be applied on top of the pad.

A coiled composite membrane assembly 24 consisting of membrane lengths 25 and 27 (with associated pressure support or reinforcement) connected to each other by a connector assembly 26 of this invention is wound onto spool 12 by fastening one end of membrane length 25 in inlet portion 18 and then rotating the spool assembly while carefully aligning the membrane assembly. Each membrane length comprises a tubular membrane surrounded by a braided support as described in the aforementioned patent applications. Connector assembly 26 is sufficiently short to allow coiling the membrane assembly without damaging or kinking adjacent portions of the membrane. The outer end of membrane 27 is located in outlet member 20 and a cover or shroud 32 that typically is molded of polymeric material is fitted onto the exterior to complete the spool assembly. Cover 32 has a small opening (not shown) located on its lower surface to provide for removal of the permeate resulting from the reverse osmosis operation.

Turning to FIGS. 2 and 3, connector assembly 26 comprises a cylindrical inner sleeve 34 that typically is made of metal. Inner sleeve 34 can have a serrated outer surface as indicated at 36 and a circumferential groove 38 is formed in the center portion of the outer surface. A linear metal spring 40 that serves as the locating member is positioned partially in groove 38. Portions of spring 40 extend outwardly from the groove as indicated in FIG. 3. A relatively soft elastomeric insert 42 projects from each end of the sleeve 34. The projecting ends have tapered or funnel shaped inner surfaces as indicated by numeral 44 while the outer surfaces of the projecting ends preferably are flush with the exterior surface of sleeve 34 and are adjacent the axial ends of the sleeve.

Referring to FIG. 4, inner sleeve 34 fits within the connected ends of membrane lengths 25 and 27 which slide onto the exterior of inner sleeve 34 to abut against spring 40. A short cylindrical insert 46 is located on the exterior surface of the end of each membrane length where each insert 46 also abuts against spring 40. Inserts 46 typically are made of a polymeric material such as polycarbonate and are sufficiently flexible to deform and grip the membrane ends under radial forces exerted in the connector assembly. The outer edges of each insert 46 have an external taper as indicated by numerals 48.

An exterior sleeve 50 that typically is made of metal completes the connector assembly. Sleeve 50 is located exteriorly of inserts 46 where it compresses spring 40 and is swaged into place with sufficient force to clamp the membrane ends between inserts 46 and the serrated outer surface of inner sleeve 34.

During reverse osmosis operation, high pressures are applied to the interior of the membrane assembly and a moderate liquid flow rate is maintained through the interior of the membrane assembly. The high pressure produces flexing of the membrane lengths and such flexing tends to break the fragile membranes at the connections thereof to the connector assembly. The resilient properties of the projections of the elastomeric insert 42 assist in preventing such breakage at the interior surfaces of the membrane lengths when negative internal pressures are imposed. Similarly, the tapered edges 48 of inserts 46 assist in preventing such breakage at the exterior surfaces of the membrane lengths when positive internal pressures are imposed. Having the tapered edges 48 at the exterior surfaces of inerts 46 improves considerably the stress distribution characteristics of the connector assembly by providing a continuous surface of curvature from the compressed diameter to the free diameter of the membrane. Inserts 46 preferably are sized so the tapered edges 48 extend within outer sleeve 50 while the tips extend beyond sleeve 50. Swaging sleeve 50 onto inserts 46 produces a continuously varying stress distribution between the sleeves and the membrane that is a maximum at the beginning of the taper and zero at the outer tip. A taper of about 5 degrees provides a highly satisfactory force distribution. The serrations 36 on the exterior surface of inner sleeve 34 preferably are spaced from the axial ends of the sleeve to provide sufficient space for sealing between the membrane and the insert.

Other types of devices can be used as locating members in place of spring 40, provided that the devices are capable of collapsing when the external sleeve is swaged into place. Polymeric clips or rings, for example, can serve effectively as the locating member.

In addition to the improved packaging, economy and efficiency provided by the invention, the connector assembly improves the versatility of reverse osmosis equipment by permitting membranes of different permselective characteristics to be assembled in a single housing. For example, the downstream membrane can have a higher rejection rate than the upstream membrane or can even be made of an entirely different material.

Thus this invention provides a connector assembly for fragile membranes of the type used in reverse osmosis and ultrafiltration operations that permits normal operation, including repeated flexing without damaging the membranes. The connector assembly is sufficiently short to avoid interfering with coiling operations of a helical reverse osmosis apparatus, for example, the entire connector assembly for a membrane having a nominal internal diameter of approximately one inch is only about 1.3 inches long.

We claim:

1. An apparatus for separating a liquid from a mixture containing said liquid comprising
a housing,
a first length of semipermeable membrane located in said housing,
a second length of semipermeable membrane located in said housing and connected to said first length, and
connector means for connecting one end of said first length to one end of said second length, said connector means comprising an inner member projecting into the ends of said first length and said second length, said inner member bearing against the interior surfaces of said first length and said second length, a locating member positioned on the exterior surface of the inner member, said locating member being spaced between the first length and the second length, and an outer member surrounding the ends of said first length and said second length, said outer member clamping said ends against said inner member.

2. The apparatus of claim 1 in which the inner member of the connector means comprises a resilient extension on each end, each of said resilient extensions bearing against the interior surfaces of the membrane adjacent to the axial end of the inner member.

3. The apparatus of claim 2 comprising deformable inserts between the exterior surface of each membrane end and the outer member of the connector assembly.

4. The apparatus of claim 3 in which each of said deformable inserts includes a tapered surface at the exterior surface of its axially outer edge.

5. The apparatus of claim 4 in which a portion of said tapered surface of each insert is subtended by said outer member.

References Cited

UNITED STATES PATENTS 3,508,662  4/1970  Miller _____ 210—541

FRANK A. SPEAR, JR., Primary Examiner

F. LANDER, Assistant Examiner

U.S. Cl. X.R.

210—494, 497.1